US009011016B2

(12) United States Patent
Adane et al.

(10) Patent No.: US 9,011,016 B2
(45) Date of Patent: Apr. 21, 2015

(54) ROLLING BEARING CAGE, ROLLING BEARING AND ELECTRIC STEERING SYSTEM OF A MOTOR VEHICLE

(71) Applicants: Thierry Adane, Tours (FR); Thomas Perrotin, Saint Roch (FR); Laurent Varnoux, Saint Avertin (FR)

(72) Inventors: Thierry Adane, Tours (FR); Thomas Perrotin, Saint Roch (FR); Laurent Varnoux, Saint Avertin (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/937,468

(22) Filed: Jul. 9, 2013

(65) Prior Publication Data

US 2014/0016889 A1 Jan. 16, 2014

(30) Foreign Application Priority Data

Jul. 12, 2012 (FR) .................................... 10 156691

(51) Int. Cl.
*F16C 33/41* (2006.01)
*F16C 33/58* (2006.01)
*F16C 33/38* (2006.01)
*F16C 19/16* (2006.01)

(52) U.S. Cl.
CPC ........... *F16C 33/3887* (2013.01); *F16C 19/166* (2013.01); *F16C 33/416* (2013.01); *F16C 33/418* (2013.01)

(58) Field of Classification Search
CPC ....... F16C 19/166; F16C 33/41; F16C 33/412; F16C 33/414; F16C 33/416; F16C 33/418
USPC .................. 384/513, 516, 523, 527, 531–534
See application file for complete search history.

(56) References Cited

U.S. PATENT DOCUMENTS

| | | | | |
|---|---|---|---|---|
| 4,019,784 | A | * | 4/1977 | Ladin et al. ...................... 384/58 |
| 6,044,723 | A | * | 4/2000 | Eda et al. ....................... 384/536 |
| 6,227,994 | B1 | * | 5/2001 | Niki et al. ...................... 474/153 |
| 6,827,496 | B2 | * | 12/2004 | Iwata et al. ................... 384/516 |
| 6,843,604 | B2 | * | 1/2005 | Hiramatsu ..................... 384/523 |
| 2005/0196086 | A1 | | 9/2005 | Terada et al. |
| 2006/0013519 | A1 | * | 1/2006 | Fukunaga ..................... 384/516 |

FOREIGN PATENT DOCUMENTS

| | | | |
|---|---|---|---|
| DE | 102006015547 | * | 10/2006 |
| DE | 102006015547 A1 | | 10/2006 |
| DE | 102007034091 | * | 1/2009 |
| FR | 2921451 A1 | | 3/2009 |
| JP | 2005287147 A | | 10/2005 |

OTHER PUBLICATIONS

Translation of DE102007034091 obtained May 20, 2014.*
Translation of DE102006015547 obtained May 20, 2014.*

* cited by examiner

*Primary Examiner* — James Pilkington
(74) *Attorney, Agent, or Firm* — Bryan Peckjian; SKF USA Inc. Patent Dept.

(57) ABSTRACT

Rolling bearing cage (5) for an electric steering system of a motor vehicle, designed to ensure the circumferential spacing of the balls (4), comprising a plurality of first sockets (8) provided with means (8a) for axially retaining the cage (5) on a ball (4) and a plurality of second sockets (9) without means for axially retaining the cage (5) on a ball (4). Each of the first sockets (8), with a ball (4) housed in the first corresponding socket (8), has a first axial clearance, a first radial clearance and a first circumferential clearance ($J_{1c}$) and each of the second sockets (9), with a ball (4) housed in the second corresponding socket (9), has a second axial clearance, a second radial clearance and a second circumferential clearance ($J_{2c}$).

17 Claims, 5 Drawing Sheets

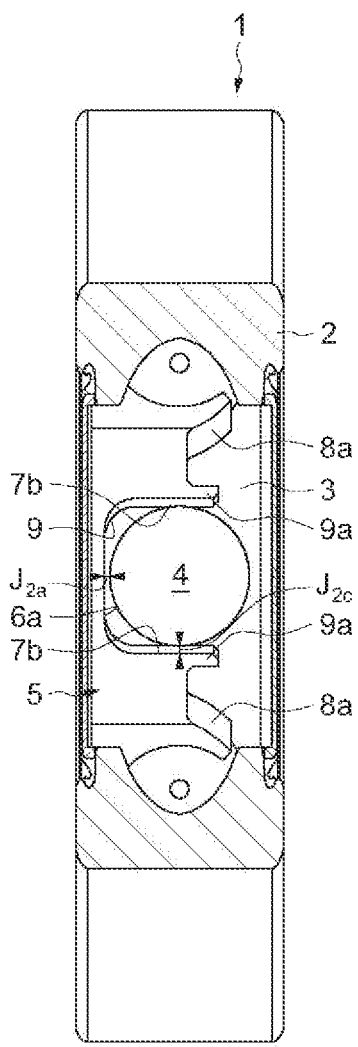
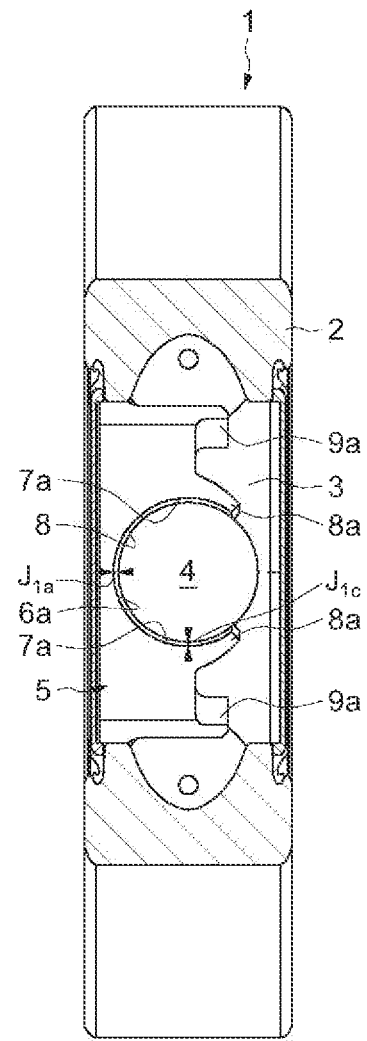

ROLLING BEARING CAGE, ROLLING BEARING AND ELECTRIC STEERING SYSTEM OF A MOTOR VEHICLE

CROSS-REFERENCE TO RELATED APPLICATIONS

This application claims priority to French patent application no. 1000156691 filed on Jul. 12, 2012, the contents of which are fully incorporated herein by reference.

FIELD OF THE INVENTION

The present invention relates to the field of rolling bearings, in particular ball bearings, used in electric steering systems of motor vehicles. More particularly, the invention relates to cages for retaining the balls, ensuring the circumferential spacing between the balls for such rolling bearings.

BACKGROUND OF THE INVENTION

An electric steering system of a motor vehicle generally comprises an electromechanical actuator located on the steering column or on the lower assembly which comprises mechanical members designed to provide the angular positioning of the drive wheels of the vehicle. The electromechanical actuator comprises a rotating electric motor, the shaft thereof being supported by at least one ball bearing device with four points of contact, directly or via a ball screw system.

The rolling bearing generally comprises an inner race, an outer race, each race being provided with two bearing tracks, and a set of rolling elements, generally balls, arranged between the four bearing tracks of the races.

FR 2 921 451 discloses cages for retaining balls for rolling bearings made of synthetic material, comprising sockets for housing the balls. The sockets are separated by claws arranged in pairs, opposite a shoulder. Such retaining cages are entirely satisfactory in many applications. However, in applications at low rotational speed or where the rotational direction changes abruptly, this type of cage causes various problems. More specifically, when the balls are under load, the cage is severely deformed and comes into contact with the inner race, which causes the damage thereof or even the destruction thereof.

Moreover, when changing the direction of the load applied to the rolling bearing, such as for example when steering the wheels of a vehicle provided with an electric steering system, as described above, when the driver performs manoeuvres to the left and to the right in order to park the vehicle, the cage is also severely deformed, or even destroyed.

The object of the present invention, therefore, is to remedy said drawbacks.

SUMMARY OF THE INVENTION

More particularly, the present invention aims to provide a cage for a rolling bearing which has low deformability, a small space requirement and evenly distributes the stresses applied to the cage.

The present invention also aims to provide a cage permitting significant clearance of the balls in the sockets of the cage, whilst providing low friction between the cage and the rolling elements.

The subject of the invention is a rolling bearing cage for an electric steering system, designed to ensure the circumferential spacing of the balls, comprising a plurality of first sockets provided with means for axially retaining the cage on a ball and a plurality of second sockets without means for axially retaining the cage on a ball.

Each of the first sockets, with a ball housed in the first corresponding socket, has a first axial clearance, a first radial clearance and a first circumferential clearance, and each of the second sockets, with a ball housed in the second corresponding socket, has a second axial clearance, a second radial clearance and a second circumferential clearance.

Thus, due to the presence of clearance between the sockets of the cage and the balls, the interaction between the cage and the balls is reduced. Moreover, the balls are mobile relative to one another, thus reducing the risk of unforeseen deformation in the case of opposing movements of two adjacent balls, for example during a steering movement of the wheels when parking the motor vehicle.

Advantageously, each of the first radial, axial and circumferential clearances ranges between 0.4% and 1.2% of the original diameter passing through the centre of the balls, preferably between 0.56% and 1.14% of the original diameter passing through the centre of the balls, for example equal to 0.78% of the original diameter passing through the centre of the balls.

According to an embodiment, each of the second radial, axial and circumferential clearances ranges between 0.4% and 1.6% of the original diameter passing through the centre of the balls, preferably between 0.56% and 1.54% of the original diameter passing through the centre of the balls, for example equal to 1.14% of the original diameter passing through the centre of the balls. The second radial, axial and circumferential clearances are thereby greater than the first radial, axial and circumferential clearances.

Each first socket may be separated from a first socket by a single second socket.

Advantageously, the first sockets are provided with substantially spherical walls, permitting the cage to be axially retained by the balls and the second sockets are provided with substantially cylindrical walls.

According to an embodiment, the cage comprises an annular shoulder extended axially by protruding portions defining the sockets between one another, each protruding portion comprising a claw, the free end thereof extending in the circumferential direction towards the claw of the adjacent protruding portion to form one of the first sockets, and a cylindrical protuberance which, with the cylindrical protuberance of the adjacent protruding portion, forms one of the second sockets.

The cage is made, for example, of synthetic material, preferably polymer material.

According to a second feature, the invention relates to a rolling bearing comprising an outer race, an inner race, each comprising two bearing tracks, a set of balls arranged between the bearing tracks forming a rolling bearing with four points of contact and a cage as described above.

Advantageously, a first point of contact between a ball and the outer race forms a first angle relative to the radial axis of symmetry passing through the centre of the balls and a second point of contact between a ball and the inner race forms a second angle relative to the radial axis of symmetry passing through the centre of the balls, the difference between the first and second angles being a maximum of 4°.

According to a third feature, the invention relates to an electric steering system of a motor vehicle comprising at least one rolling bearing as described above.

BRIEF DESCRIPTION OF THE DRAWINGS

The present invention will be understood more clearly by reading the description of several embodiments provided by way of non-limiting example and illustrated in the accompanying drawings, in which:

FIGS. 2, 3, 4 and 5 are sectional views, respectively along the axes II-II, III-III, IV-IV and V-V of FIG. 1;

DETAILED DESCRIPTION OF THE INVENTION

The rolling bearing, having the axial axis X-X, referenced 1 in its entirety in FIGS. 1 to 4, is designed to be mounted in a steering column of a motor vehicle.

Figure 1:
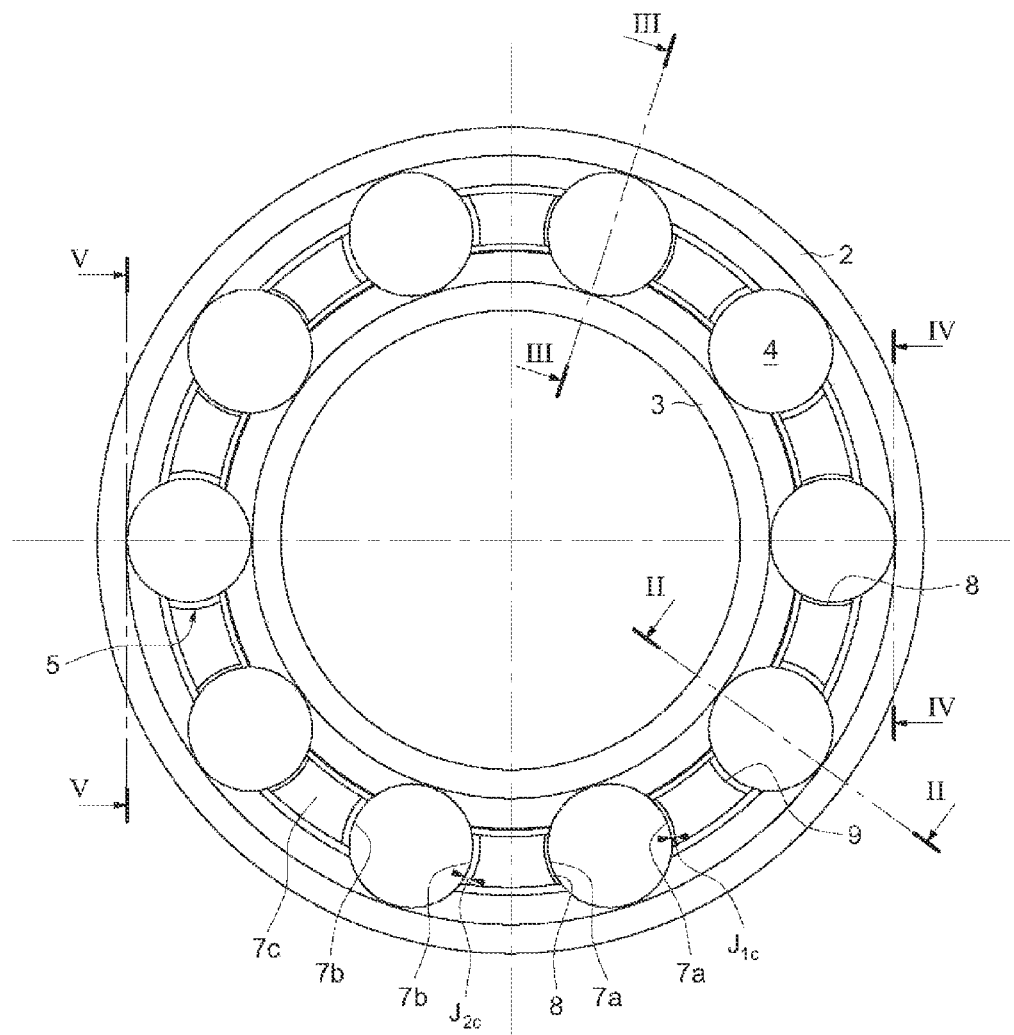
FIG. 1 is an axial sectional view of a rolling bearing according to the invention.
Figure 2:
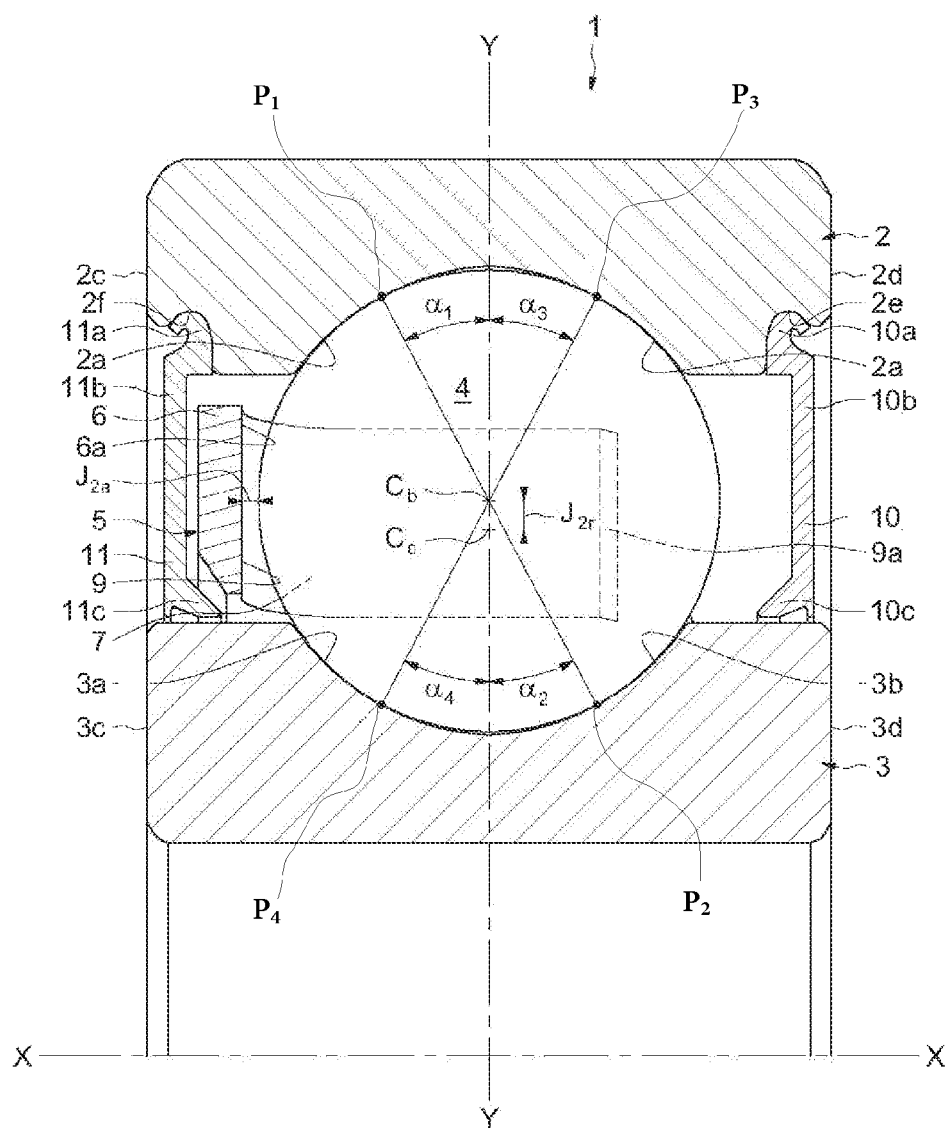

As illustrated in FIGS. 1 and 2, the rolling bearing 1 comprises an outer race 2, an inner race 3, a set of rolling elements 4, such as balls, and a cage 5 for maintaining the uniform circumferential spacing of the balls 4.

The inner race 3 is in the form of a ring of generally rectangular section having a small radial thickness and provided on its external surface with two toroidal bearing tracks 3a, 3b. The outer race 2, in a similar manner to the inner race 3, comprises two toroidal bearing tracks 2a, 2b on its internal bore. The inner and outer races 3, 2 have front radial surfaces 3b, 3c, 2b, 2c which are substantially aligned and may each be produced in one piece by machining from one piece of steel.

Each ball 4 is in contact with the four bearing tracks 2a, 2b, 3a, 3b formed on the inner 3 and outer 2 races. A first point of contact $P_1$ between a ball 4 and a first bearing track 2a of the outer race 2 forms a first angle $\alpha_1$ relative to the radial axis of symmetry Y-Y passing through the centre of the balls 4. A second point of contact $P_2$ between a ball 4 and a first bearing track 3b of the inner race 3 forms a second angle $\alpha_2$ relative to the radial axis of symmetry Y-Y passing through the centre of the balls 4. A third point of contact $P_3$ between a ball 4 and a second bearing track 2b of the outer race 2 forms a third angle $\alpha_3$ relative to the radial axis of symmetry Y-Y passing through the centre of the balls 4. A fourth point of contact $P_4$ between a ball 4 and a second bearing track 3a of the inner race 3 forms a fourth angle $\alpha_4$ relative to the radial axis of symmetry Y-Y passing through the centre of the balls 4. The difference between the first and the second angles $\alpha_1$ and $\alpha_2$ and between the third and fourth angles $\alpha_3$ and $\alpha_4$ is a maximum of 4° in order to permit the balls to be in the greatest possible permanent contact with the four bearing tracks defined by the inner and outer bearing races.

The cage 5 is arranged radially between the outer and inner races 2, 3. The cage 5 comprises a circular annular portion 6 arranged axially on one side of the balls 4 forming an annular shoulder, and protruding portions 7 or separating fingers, extending axially from the annular shoulder 6. The protruding parts 7 are formed in one piece with the annular shoulder 6 and between one another define sockets 8, 9 in which the balls 4 are arranged.

The cage 5 comprises a plurality of first sockets 8 provided with means for axially retaining the cage 5 on a ball 4 and a plurality of second sockets 9 without means for axially retaining the cage 5 on a ball 4. A plurality of claws 8a provide the means for axially retaining the cage 4 on a ball 4. Each first socket 8 is separated from a first socket 8 by a second socket 9. The first sockets 8 are thus uniformly distributed circumferentially to ensure uniform axial retention of the cage 5 on the balls 4. The first sockets 8 are provided with substantially spherical walls and the second sockets 9 are provided with substantially cylindrical walls. A first socket 8 is separated from a second adjacent socket by a protruding portion 7.

Each protruding portion 7 comprises a spherical wall 7a which further supports the claws 8a oriented radially opposite the annular shoulder 6, the free end thereof extending in the circumferential direction towards the claw 8a of the adjacent protruding portion 7 to form one of the first sockets 8 of substantially spherical shape, tending to enclose a ball 4. In other words, the two claws 8a associated with one of the first sockets 8 extend towards one another and are capable of providing the axial retention of the cage 5 on the ball 4 arranged in said first socket 8. The cage 5 is axially retained on the set of balls 4 by claws 8a of the first sockets 8. As each first socket 8 is separated from a first socket 8 by a second socket 9, the first sockets 8 are thus uniformly distributed circumferentially to ensure uniform axial retention of the cage 5 on the balls 4. The internal concave surface of the claw 8a forms part of the spherical surface 7a of the first socket 8.

Each protruding portion 7 further comprises a cylindrical protuberance 9a oriented radially opposite the annular shoulder 6 and forming, with the cylindrical protuberance 9a of the adjacent protruding portion 7, one of the second sockets of substantially cylindrical shape, forming a socket without means for axially retaining the cage 5 on the balls 4. The cylindrical protuberance 9a is thus incapable of ensuring the axial retention of the cage 5 relative to the ball 4 arranged in the corresponding second socket 9. The internal cylindrical surface of the cylindrical protuberance 9a forms part of the cylindrical surface 7b of the second socket 9. The cylindrical protuberance 9a and the claw 8a of one of the axial portions 7 are separated by a recess 7c, such that the claw 8a has a relatively small angular depth in the circumferential direction and, as a result, a certain flexibility permitting the cage 5 to be clicked into place on the balls 4 by circumferentially separating the claws 8a when an axial thrust is exerted on the annular shoulder 6 of the cage 5 in the direction of the balls 4.

Each of the sockets 8, 9 is open on its internal and external surface, and is also open axially on the side opposing the annular shoulder 6, thus permitting the cage 5 to be positioned. The second sockets 9 thus have an axial opening provided with cylindrical edges 7b in order to reduce the friction of the balls 4 on the cage 5.

The diameter of the spherical walls 7a of the first sockets 8 is greater than that of the balls 4 in order to provide, with a ball 4 housed in said first corresponding socket 8, a first axial clearance $J_{1a}$, a first radial clearance $J_{1r}$ and a first circumferential clearance $J_{1c}$. The diameter of the cylindrical walls 7b of the second sockets 9 is greater than that of the balls 4 in order to provide, with a ball 4 housed in the second corresponding socket 9, a second axial clearance $J_{2a}$, a second radial clearance $J_{2r}$ and a second circumferential clearance $J_{2c}$. The axial clearances $J_a$ correspond to the distance between the internal surface 6a of the annular shoulder 6 and the ball 4 housed in the corresponding socket. The circumferential clearances $J_c$ correspond to the distance between the internal spherical or cylindrical surface 7a, 7b of the corresponding socket 8, 9 and the ball 4 housed in the corresponding socket. The radial clearances $J_r$ correspond to the distance between the centre $C_b$ of a ball 4 and the centre $C_c$ of the corresponding socket 8 or 9.

Each of the first radial $J_{1r}$, axial $J_{1a}$ and circumferential $J_{1c}$ clearances ranges between 0.4% and 1.2% of the original diameter passing through the centre $C_b$ of the balls 4, preferably between 0.56% and 1.14%, ideally equal to 0.78%. Each of the second radial $J_{2r}$, axial $J_{2a}$ and circumferential $J_{2c}$ clearances ranges between 0.4% and 1.6% of the original diameter passing through the centre $C_b$ of the balls, preferably between 0.56% and 1.54%, ideally equal to 1.14%.

By way of non-limiting example, for an effective diameter of 50 mm, each of the first radial $J_{1r}$, axial $J_{1a}$ and circumferential $J_{1c}$ clearances ranges between 0.2 mm and 0.6 mm, preferably between 0.28 mm and 0.57 mm, ideally equal to 0.39 mm and each of the second radial $J_{2r}$, axial $J_{2a}$ and circumferential $J_{2c}$ clearances ranges between 0.2 mm and 0.8 mm, preferably between 0.28 mm and 0.77 mm, ideally equal to 0.57 mm.

The cage may, for example, be made of synthetic material, preferably polymer material, such as for example PA66, PA46, polyether ether ketone (PEEK).

Figure 3:
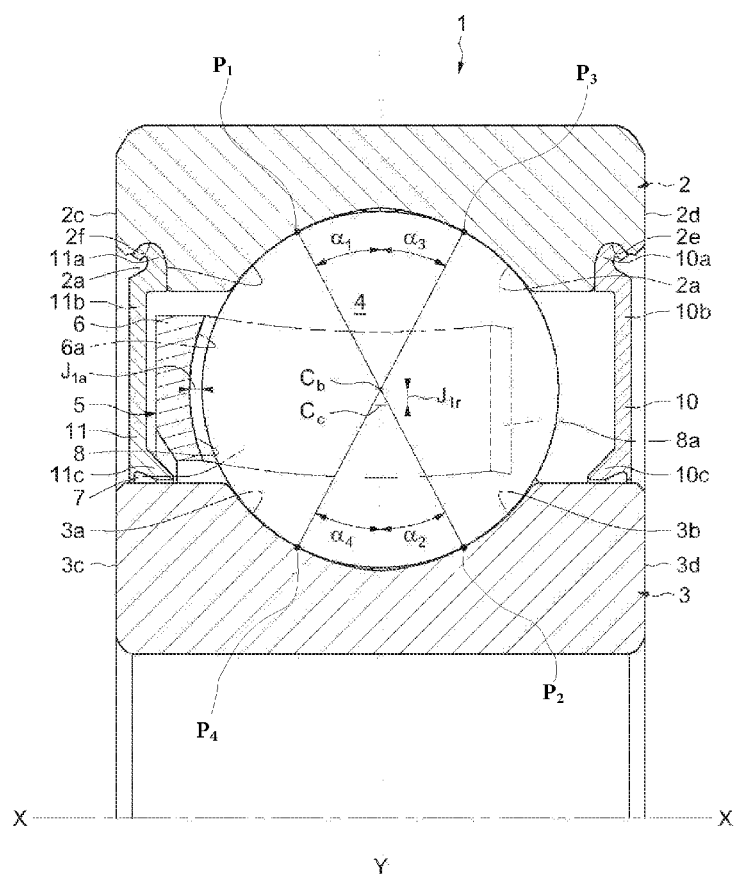
Figure 6:
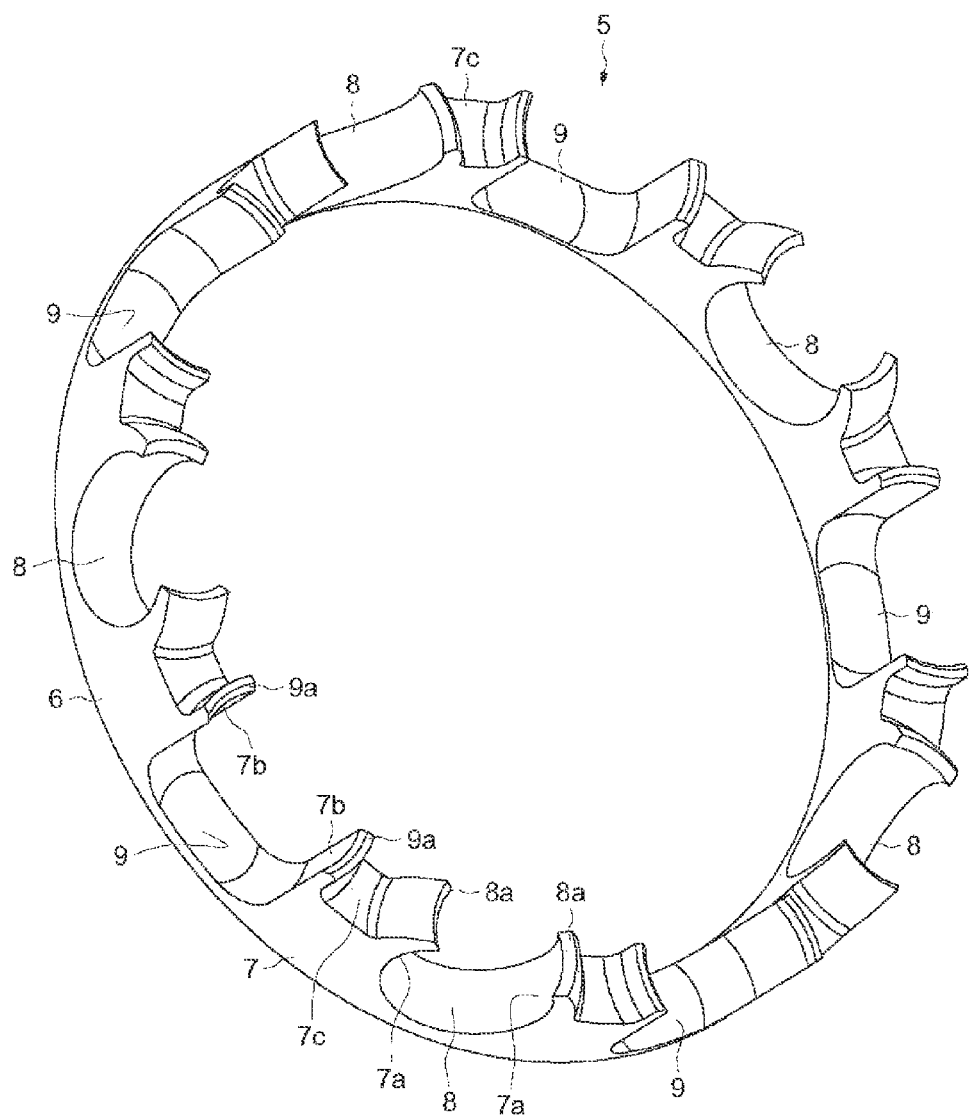
FIG. 6 is a perspective view of a cage according to FIG. 1.

As illustrated in FIGS. 2 and 3, the rolling bearing 1 comprises sealing means 10, 11 arranged on either side of the balls 4 in order to prevent the introduction of polluting particles onto the balls 4 and, in particular, the bearing tracks 2a, 2b, 3a, 3b. The sealing means 10, 11 are fixed by a first end 10a, 11a in a notch 2e, 2f formed on the internal bore of the outer race 2 and extend, respectively by a radial portion 10b, 11b, towards the external surface of the inner race 3 having one end 10c, 11c in the vicinity of the external surface of the inner race 3 which permits a very narrow space to be present relative to the external surface of the inner race 3 to form a seal.

By means of the invention, the sockets of the cage have significant clearance relative to the balls, permitting the interaction between the cage and the balls to be reduced. The cage thus has low deformability and, due to the low friction between the cage and the rolling elements, the cage has a longer service life.

Moreover, the balls are mobile relative to one another, reducing the risk of unforeseen deformation in the event of opposing movements of two adjacent balls, for example during a steering movement of the wheels when parking the motor vehicle.

The invention claimed is:

1. A rolling bearing cage (5) for an electric steering system of a motor vehicle, designed to ensure the circumferential spacing of a plurality of balls (4), comprising:
   a plurality of first sockets (8) provided with means (8a) for axially retaining the cage (5) on a ball (4), and
   a plurality of second sockets (9) without means for axially retaining the cage (5) on a ball (4),
   each of the first sockets (8), with a ball (4) housed in the first corresponding socket (8), has a first axial clearance ($J_{1a}$), a first radial clearance ($J_{1r}$) and a first circumferential clearance ($J_{1c}$) and in that each of the second sockets (9), with a ball (4) housed in the second corresponding socket (9), has a second axial clearance ($J_{2a}$), a second radial clearance ($J_{2r}$) and a second circumferential clearance ($J_{2c}$), wherein the second radial clearance ($J_{2r}$) is greater than the first radial clearance ($J_{1r}$) and the second circumferential clearance ($J_{2c}$) is greater than the first circumferential clearance ($J_{1c}$).

2. The cage according to claim 1, wherein each of the first radial, axial and circumferential clearances ($J_{1r}$, $J_{1a}$, $J_{1c}$) ranges between 0.4% and 1.2% of an original diameter passing through the centre ($C_b$) of the balls (4).

3. The cage according to claim 1, wherein each of the first radial, axial and circumferential clearances ($J_{1r}$, $J_{1a}$, $J_{1c}$) ranges between 0.56% and 1.14% of an original diameter passing through the centre ($C_b$) of the balls (4).

4. The cage according to claim 1, wherein each of the first radial, axial and circumferential clearances ($J_{1r}$, $J_{1a}$, $J_{1c}$) is equal to 0.78% an original diameter passing through the centre ($C_b$) of the balls (4).

5. The cage according to claim 1, wherein each of the second radial, axial and circumferential clearances ($J_{2r}$, $J_{2a}$, $J_{2c}$) ranges between 0.4% and 1.6% of an original diameter passing through the centre ($C_b$) of the balls (4).

6. The cage according to claim 1, wherein each of the second radial, axial and circumferential clearances ($J_{2r}$, $J_{2a}$, $J_{2c}$) ranges between 0.56% and 1.54% of an original diameter passing through the centre ($C_b$) of the balls (4).

7. The cage according to claim 1, wherein each of the second radial, axial and circumferential clearances ($J_{2r}$, $J_{2a}$, $J_{2c}$) is equal to 1.14% of an original diameter passing through the centre ($C_b$) of the balls (4).

8. The cage according to claim 1, wherein each first socket (8) is separated from a first socket (8) by a single second socket (9).

9. The cage according to claim 1, wherein the first sockets (8) are provided with substantially spherical walls (7a) and the second sockets (9) are provided with substantially cylindrical walls (7b).

10. The cage according to claim 1, further comprising an annular shoulder (6) extended axially by protruding portions (7) defining the sockets (8, 9) between one another, each protruding portion (7) having a claw (8a), the free end thereof extending in the circumferential direction towards the claw (8a) of an adjacent protruding portion (7) to form one of the first sockets (8), and a cylindrical protuberance (9a) which, with the cylindrical protuberance (9a) of an adjacent protruding portion (7), forms one of the second sockets (9).

11. The cage according to claim 1, further comprising the cage being made of synthetic material.

12. The cage according to claim 1, wherein the plurality of first sockets and the plurality of second sockets are positioned in an alternating fashion such that no socket of the plurality of first sockets is adjacent to another socket of the plurality of first sockets and that no socket of the plurality of second sockets is adjacent to another socket of the plurality of second sockets.

13. A rolling bearing (1) comprising:
   an outer race (2),
   an inner race (3), each of the outer race and the inner race providing two bearing tracks (2a, 2b, 3a, 3b),
   a set of balls (4) arranged between the bearing tracks (2a, 2b, 3a, 3b) forming a rolling bearing with four points of contact ($P_1$, $P_2$, $P_3$, $P_4$), and
   a cage (5) including a plurality of first sockets (8) provided with means (8a) for axially retaining the cage (5) on a ball (4), and
   a plurality of second sockets (9) without means for axially retaining the cage (5) on a ball (4), wherein
   each of the first sockets (8), with a ball (4) housed in the first corresponding socket (8), has a first axial clearance ($J_{1a}$), a first radial clearance ($J_{1r}$) and a first circumferential clearance ($J_{1c}$) and in that each of the second sockets (9), with a ball (4) housed in the second corresponding socket (9), has a second axial clearance ($J_{2a}$), a second radial clearance ($J_{2r}$) and a second circumferential clearance ($J_{2c}$), wherein the second radial clearance ($J_{2r}$) is greater than the first radial clearance ($J_{1r}$) and the second circumferential clearance ($J_{2c}$) is greater than the first circumferential clearance ($J_{1c}$).

14. The rolling bearing according to claim 13, wherein a first point of contact ($P_1$) between a ball (4) and the outer race (2) forms a first angle ($\alpha_1$) relative to the radial axis of symmetry (Y-Y) passing through the centre ($C_b$) of the balls (4) and a second point of contact ($P_2$) between a ball (4) and the inner race (3) forms a second angle ($\alpha_2$) relative to the radial axis of symmetry (Y-Y) passing through the centre ($C_b$) of the balls (4), the difference between the first and second angles ($\alpha_1$ and $\alpha_2$) being a maximum of 4°.

15. The roller bearing according to claim 13, wherein the plurality of first sockets and the plurality of second sockets are positioned in an alternating fashion such that no socket of the plurality of first sockets is adjacent to another socket of the plurality of first sockets and that no socket of the plurality of second sockets is adjacent to another socket of the plurality of second sockets.

16. A rolling bearing, comprising:
    an outer race (2),
    an inner race (3),
    a set of balls (4) arranged between the outer race and the inner race, and
    a cage (5) including a plurality of first sockets (8) provided with means (8*a*) for axially retaining the cage (5) on a ball (4), and
    a plurality of second sockets (9) without means for axially retaining the cage (5) on a ball (4), wherein
    each of the first sockets (8), with a ball (4) housed in the first corresponding socket (8), has a first axial clearance ($J_{1a}$), a first radial clearance ($J_{1r}$) and a first circumferential clearance ($J_{1c}$) and each of the second sockets (9), with a ball (4) housed in the second corresponding socket (9), has a second axial clearance ($J_{2a}$), a second radial clearance ($J_{2r}$) and a second circumferential clearance ($J_{2c}$), wherein the second radial clearance ($J_{2r}$) is greater than the first radial clearance ($J_{1r}$) and the second circumferential clearance ($J_{2c}$) is greater than the first circumferential clearance ($J_{1c}$).

17. The rolling bearing according to claim 16, wherein the plurality of first sockets and the plurality of second sockets are positioned in an alternating fashion such that no socket of the plurality of first sockets is adjacent to another socket of the plurality of first sockets and that no socket of the plurality of second sockets is adjacent to another socket of the plurality of second sockets.

* * * * *